US009432723B2

(12) United States Patent
Luthra (10) Patent No.: US 9,432,723 B2
(45) Date of Patent: Aug. 30, 2016

(54) METHOD OF ENCODING VIDEO CONTENT (75) Inventor: Ajay K. Luthra, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 183 days.

(21) Appl. No.: 12/849,308

(22) Filed: Aug. 3, 2010

(65) Prior Publication Data
US 2011/0026608 A1 Feb. 3, 2011

Related U.S. Application Data (60) Provisional application No. 61/230,780, filed on Aug. 3, 2009.

(51) Int. Cl.
| | |
|---|---|
| H04N 7/24 | (2011.01) |
| H04N 7/26 | (2006.01) |
| H04N 13/02 | (2006.01) |
| H04N 21/434 | (2011.01) |
| H04N 21/2365 | (2011.01) |
| H04N 19/597 | (2014.01) |
| H04N 19/46 | (2014.01) |
| H04N 19/61 | (2014.01) |
| H04N 19/86 | (2014.01) |
| H04N 19/70 | (2014.01) |

(Continued)

(52) U.S. Cl.
CPC .......... *H04N 21/4347* (2013.01); *H04N 19/46* (2014.11); *H04N 19/597* (2014.11); *H04N 19/61* (2014.11); *H04N 19/86* (2014.11); *H04N 21/2365* (2013.01); *H04N 19/117* (2014.11); *H04N 19/174* (2014.11); *H04N 19/70* (2014.11)

(58) Field of Classification Search
CPC ............... H04N 7/50; H04N 7/26941; H04N 21/2365; H04N 21/4347; H04N 21/23608
USPC .................... 375/240.01, 240.26; 348/42, 51
See application file for complete search history.

(56) References Cited

U.S. PATENT DOCUMENTS 5,394,524 A 2/1995 DiNicola et al.
7,058,965 B1 6/2006 Gordon et al.
(Continued)

FOREIGN PATENT DOCUMENTS

CN 101232616 A 7/2008
EP 1501318 A1 1/2005
(Continued)

OTHER PUBLICATIONS

PCT Search Report & Written Opinion, Re: Application #PCT/US10/44266; Sep. 29, 2010.
(Continued)

*Primary Examiner* — Jamie Atala
*Assistant Examiner* — On S Mung (57) ABSTRACT

In a method of encoding video content, bits of a first view and a second view of a three-dimensional (3D) video content are manipulated to occupy a first slice of video and a second slice of video, wherein a boundary is configured to be formed between the first and second slices. In addition, the bits of each of the first slice and the second slice are encoded separately from each other to form a first independently compressed video slice and a second independently compressed video slice. The first and second independently compressed video slices are then multiplexed to form at least one transport stream operable to be processed to render at least one of two-dimensional (2D) and 3D video.

21 Claims, 8 Drawing Sheets (51) Int. Cl.
*H04N 19/117* (2014.01)
*H04N 19/174* (2014.01)

(56) References Cited

U.S. PATENT DOCUMENTS

| | | |
|---|---|---|
| 2002/0009137 A1* | 1/2002 | Nelson et al. ............. 375/240.1 |
| 2004/0066854 A1* | 4/2004 | Hannuksela ............. 375/240.27 |
| 2005/0008079 A1* | 1/2005 | Boon et al. ............. 375/240.27 |
| 2005/0078108 A1* | 4/2005 | Swift et al. .................. 345/419 |
| 2005/0084006 A1 | 4/2005 | Lei et al. |
| 2005/0147309 A1* | 7/2005 | Katata et al. ................. 382/239 |
| 2006/0139448 A1 | 6/2006 | Ha et al. |
| 2006/0146734 A1* | 7/2006 | Wenger et al. ............. 370/260 |
| 2006/0221178 A1* | 10/2006 | Yun et al. ...................... 348/42 |
| 2007/0002041 A1 | 1/2007 | Kim et al. |
| 2008/0055463 A1 | 3/2008 | Lerner et al. |
| 2008/0089412 A1 | 4/2008 | Ugur et al. |
| 2008/0310499 A1 | 12/2008 | Kim et al. |
| 2009/0263032 A1* | 10/2009 | Tanaka et al. ................ 382/233 |
| 2009/0316793 A1* | 12/2009 | Yang et al. ............. 375/240.24 |
| 2010/0246683 A1* | 9/2010 | Webb et al. ............. 375/240.16 |

FOREIGN PATENT DOCUMENTS

| | | |
|---|---|---|
| WO | 2007081838 A1 | 7/2007 |
| WO | 2009040701 A2 | 4/2009 |
| WO | 2011143599 A1 | 11/2011 |

OTHER PUBLICATIONS

European Patent Office, "Extended European Search Report" for Patent Application No. 10807037.6 Dec. 13, 2013, 7 pages.

Office Action for CN Patent Application No. 201080034583.X, mailed on Sep. 17, 2014, 17 pages.

Office Action Response for European Patent Application No. 10807037.6, filed on Jul. 8, 2014, 17 pages.

* cited by examiner

METHOD OF ENCODING VIDEO CONTENT

CLAIM OF PRIORITY

The present application claims the benefit of priority to U.S. Provisional Patent Application Ser. No. 61/230,780, filed on Aug. 3, 2009, entitled "Backward Compatible 3D TV Format and Method", the disclosure of which is hereby incorporated by reference in its entirety.

BACKGROUND

Depth perception for a three dimensional television (3D TV) is provided by capturing two views, one for the left eye and other for the right eye. These two views are compressed and sent over various networks or stored on storage media. A decoder decodes the two views and sends the decoded video to the 3D TV for display. The two views are known to be either merged into a single video frame or kept separate.

A known benefit of merging the two views in a single video frame is that current encoders and decoders can be used to compress and decompress the video. However, this approach creates two problems. First, video compression algorithms, such as MPEG-4 AVC based compression algorithms, cause cross talk between the two views at their edges. One approach currently used to avoid cross talk between the two eye views is to turn off the deblocking filter in the AVC/H.264 encoding process. However, this approach is known to reduce coding efficiency and creates blocking artifacts in the video. A second problem with merging the two views in a single video frame is that the merged video is not backward compatible with two dimensional (2D) TVs, that is, current 2D TVs cannot display the decoded video corresponding to one of the two views.

SUMMARY

According to an embodiment, a method of encoding video content is disclosed. The method includes manipulating bits of a first view and a second view of a three-dimensional (3D) video content to occupy a first slice of video and a second slice of video. A boundary is configured to be formed between the first and second slices. Each of the bits of first slice and the second slice is encoded separately from each other to form a first independently compressed video slice and a second independently compressed video slice. Thereafter, the first and second independently compressed video slices are multiplexed to form at least one transport stream operable to be processed to render at least one of the two-dimensional (2D) and the 3D video.

According to another embodiment, a video encoder is operable to encode video content. The video encoder includes one or more modules configured to manipulate bits of a first view and a second view of a three-dimensional (3D) video content to occupy a first slice of video and a second slice of video. A boundary is configured to be formed between the first and second slices. The one or more modules are also configured to encode the bits of each of the first and the second slices separately from each other to form a first independently compressed video slice and a second independently compressed video slice, and to multiplex the first independently compressed video slice and the second independently compressed video slice to form at least one transport stream which is operable to be processed to render at least one of the 2D and the 3D video. The video encoder also includes a processor configured to implement the one or more modules.

According to another embodiment, a method of rendering at least one transport stream into a displayable video is disclosed. The method includes receiving the at least one transport stream, which includes a first independently compressed video slice corresponding to a first view of a three-dimensional (3D) video and a second independently compressed video slice corresponding to a second view of the 3D video. The first and second independently compressed video views are configured to occupy separate slices of video. A boundary is configured to be formed between the first and second slices. The bits of at least one of the first and second independently compressed video slices are then decoded. One of a 2D and a 3D video are rendered using the at least one decoded first and second independently compressed video slices.

According to another embodiment, a video decoder includes one or more modules configured to receive at least one transport stream including a first independently compressed slice corresponding to a first view of a 3D video and a second independently compressed video slice corresponding to a second view of the 3D video. The first and second views are configured to occupy separate slices of video. A boundary is configured to be formed between the first and second slices. The one or more modules are further configured to decode bits of at least one of the first and second independently compressed video slices and to render one of a 2D and a 3D video using the at least one of the first and second independently compressed video slices. The video decoder also includes a processor configured to implement the one or more modules Still in a further embodiment, a computer readable storage medium on which is embedded one or more computer programs implements the above-disclosed methods of encoding the video content and rendering a transport stream into a displayable video is disclosed.

Embodiments of the present invention provide a method and apparatus for encoding video content to be rendered by a decoder as one of a 2D and a 3D video. The video content includes first and second views that correspond to displays for left and right eyes. When the video content is to be displayed as a 3D video, both the first views and second views are rendered. However, when the video content is to be displayed as a 2D video, such as, when a set-top box is equipped with a 2D decoder, only one of the first view and the second view is rendered. As such, a single transport stream containing both the first view and the second view may be transmitted to set-top boxes having one of a 2D and a 3D decoder. Alternately, multiple transport streams containing the first and second views may be sent with a single one of the multiple transport streams being operable to render 2D video.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Figure 1:
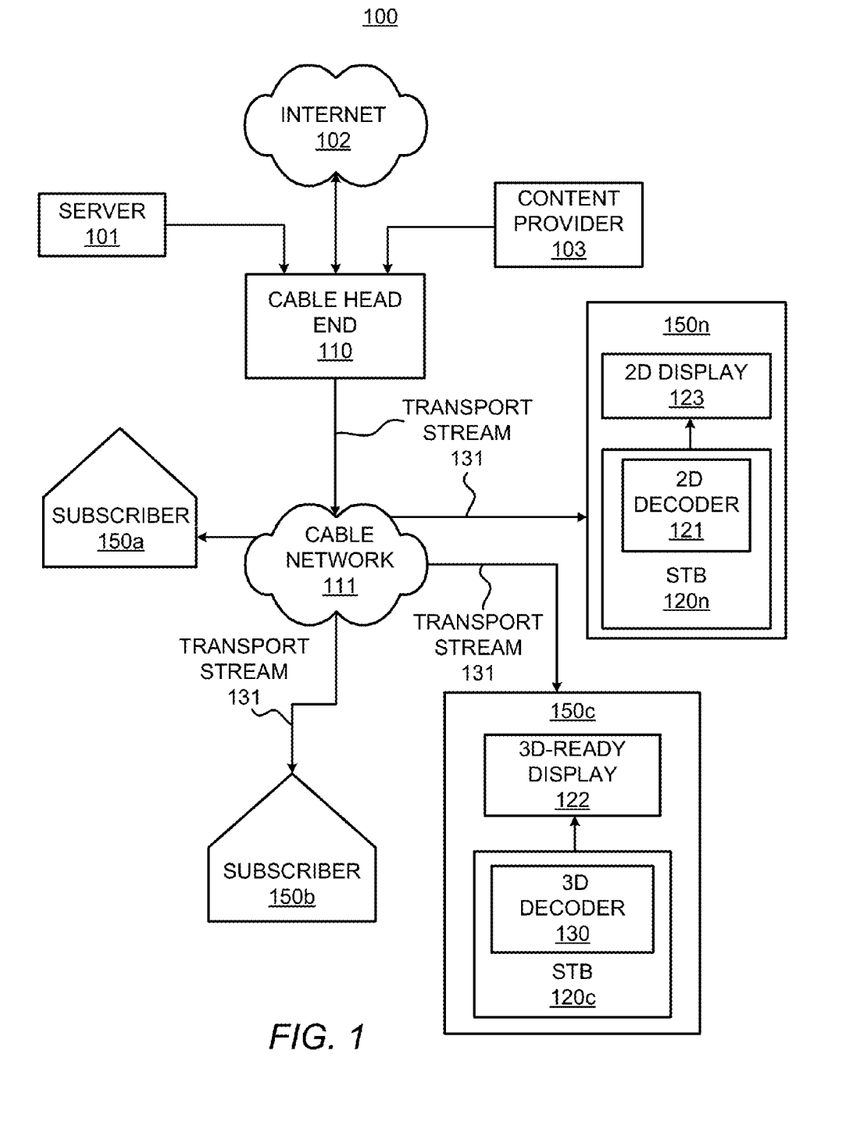
FIG. 1 illustrates a network architecture, according to an embodiment of the invention.

FIG. 1 illustrates a network architecture 100 of a system in which a 3D video decoder 130 may be used, according an embodiment. As shown in FIG. 1, the network architecture 100 is illustrated as a cable television (CATV) network architecture, including a cable head-end 110 and a cable network 111. A number of data sources 101, 102, 103, may be communicatively coupled to the cable head-end 110 including, but in no way limited to, a plurality of servers 101, the Internet 102, radio signals, or television signals received via a content provider 103. The cable head-end 110 is also communicatively coupled to one or more subscribers 150a-150n through the cable network 111. It should be understood that the network architecture 100 depicted in FIG. 1 may include additional components and that some of the components described herein may be removed and/or modified without departing from a scope of the network architecture 100.

The cable head-end 110 is configured to output a transport stream 131 to the subscribers' 150a-150n set top boxes (STBs) 120a-120n through the cable network 111, which may include a satellite transmission, the Internet 102 or other network using, for instance, fixed optical fibers or coaxial cables. The STBs 120a-120n are devices receive the transport stream 131 from the cable head-end 110 and processes the transport stream 131 to be in a format for display on a television, computer monitor, personal digital assistant (PDA), cellular telephone, etc. According to an embodiment, one or more of the STBs 120a-120n comprise standalone devices supplied by a cable or satellite television provider. According to another embodiment, one or more of the STBs 120a-120n comprise devices and/or software integrated into one or more of televisions, computers, cellular telephones, PDAs, etc.

Each of the STBs 120a-120n is equipped with a 2D decoder 121 and/or a 3D decoder 130. The 2D decoder 121 is configured to decode 2D content; whereas the 3D decoder 130 is configured to decode 3D content and may also be configured to decode 2D content. In addition, or alternatively, one or more of the STBs 120a-120n may be equipped with both a 2D decoder 121 and a 3D decoder 130 to thus be able to decode both types of content. In any regard, the STBs 120a-120n are configured to output the decoded content to either a 2D display 123 or a 3D-ready display 122. In order to display the 3D content, a 3D-ready display 122 is required. As discussed in greater detail herein below, the transport stream 131 is configured to provide cross standard compatibility for both the 3D video decoders 130 and 2D decoders 121.

Figure 2:
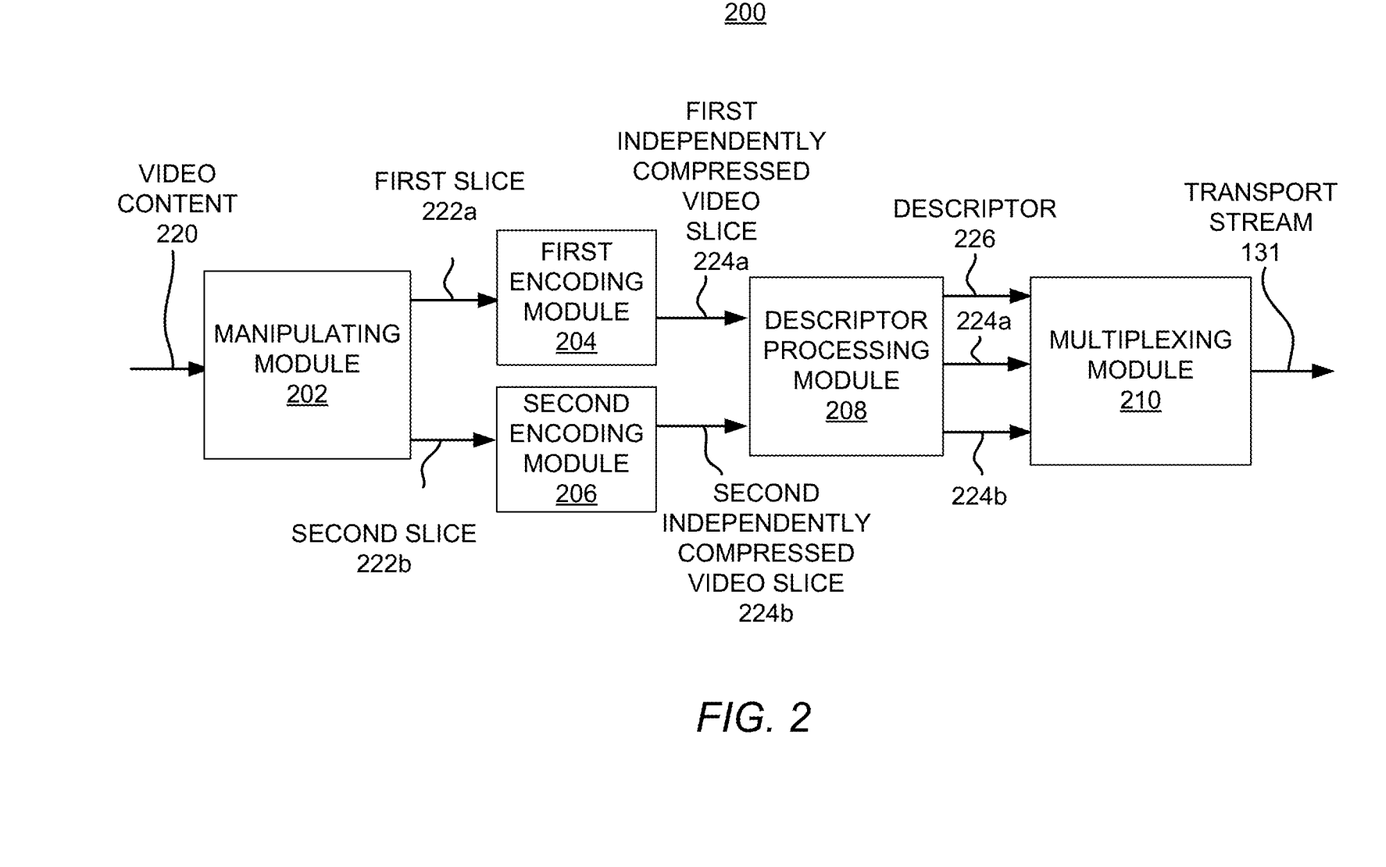
FIG. 2 illustrates a functional block diagram of a 3D video encoder, according to an embodiment of the invention.

FIG. 2 illustrates a functional block diagram of a 3D video encoder 200, according to an embodiment. The 3D video encoder 200 may form part of or be included in the cable head end 110 depicted in FIG. 1 and may generally be configured to render video for transmission to the subscribers 150a-150n. It should be understood that the 3D video encoder 200 depicted in FIG. 2 may include additional components and that some of the components described herein may be removed and/or modified without departing from a scope of the 3D video encoder 200.

As shown in FIG. 2, the 3D video encoder 200 includes a manipulating module 202, a first encoding module 204, a second encoding module 206, a descriptor processing module 208 and a multiplexing module 210. The modules 202-210 may comprise software, hardware, or a combination of software and hardware. Thus, in one embodiment, one or more of the modules 202-210 comprise circuit components. In another embodiment, one or more of the modules 202-210 comprise software code stored on a computer readable storage medium, which is executable by a processor.

The manipulating module 202 is configured to access video content 220 to be rendered as 3D video. The video content 220 may be accessed, for instance, by receiving the video content from broadcast programs, Internet Protocol TV (IPTV), switched video (SDV), video on demand (VOD) or other video sources, as shown in FIG. 1. The video content 220 includes a first view and a second view (not shown) that enable the video content 220 to be displayed in 3D video format. The first view comprises one of a left eye view and right eye view and the second view comprises the other of the left eye view and the right eye view.

The manipulating module 202 is configured to manipulate the first view and the second view to occupy a first slice 222a of video and a second slice 222b of video that may be displayed as slices of video. The manipulating module is also configured to form a boundary between the first and second slices 222a-222b. The first slice 222a and the second slice 222b may be displayed by a 3D-ready display 122 in one or more of various manners to provide a viewer with a 3D viewing experience. As also discussed below, a 2D decoder 121 may decode either of the first slice 222a and the second slice 222b to display the video content 220 on a 2D display 123.

Figure 8:
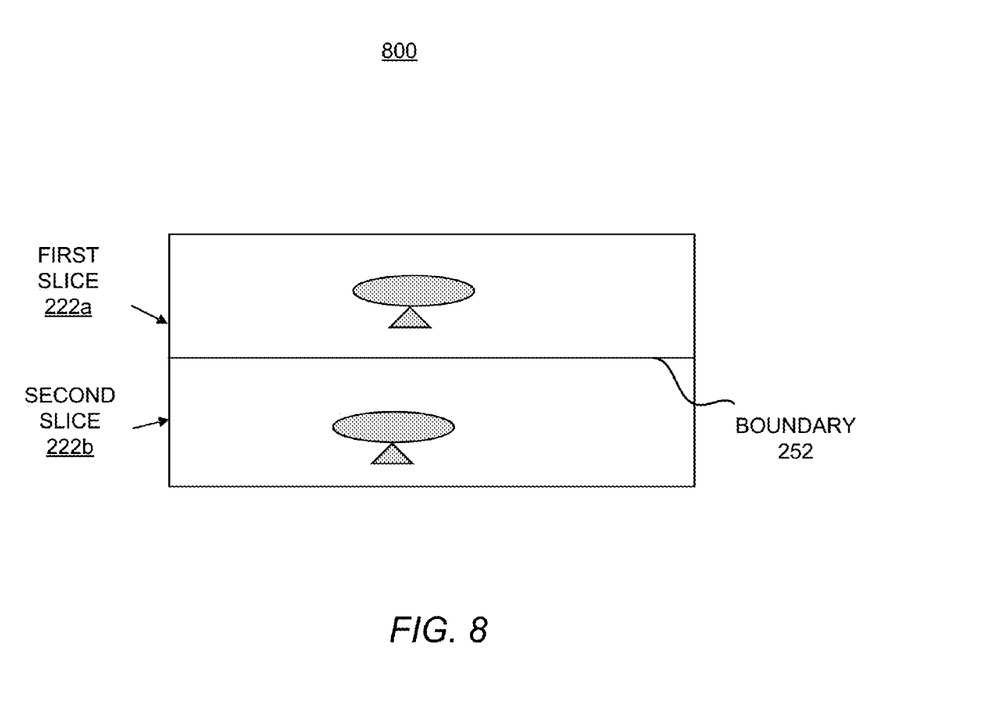
FIG. 8 illustrates a diagram of slices of video, according to an embodiment of the invention.

An example of a manner in which the first slice 222a and the second slice 222b may be displayed as slices of video 800 is shown in FIG. 8. As shown in FIG. 8, the slices of video 800 are horizontally arranged and comprise a top half corresponding to the first view and a bottom half corresponding to the second view. The horizontal arrangement of the slices of video 800 allow a decoder better efficiency in reading the separate slices of video. In addition, the top half and the bottom half of the video 800 is separated by a boundary 252. The boundary 252 between the two slices 222a and 222b enables the deblocking filter to be turned off across the boundary 252, while still enabling deblocking filtering to be performed within each of the slices 222a-222b. As such, cross-talk between the first view 222a and the second view 222b may be avoided. By leaving the deblocking activated within each of the slices 222a-222b, the coding efficiency is not greatly affected and the noise due to blocking is substantially reduced.

The manipulating module 202 is also configured to output the slices of video 800 to separate encoding modules 204 and 206. Although two encoding modules 204 and 206 configured to separately encode the slices of video 800, the 3D video encoder 200 may include any number of encoding modules 204 and 206 without departing from a scope of the invention. In this example, the manipulator 202 may manipulate either or both of the top and bottom halves of the separate slices of video 800 into more than one integer number of slices. As such, the manipulator 202 may manipulate the video content 220 into more than two slices to thus form more than two separate video streams, which may each be encoded separately. In the interest of clarity, the following discussion will be directed to instances in which the video content is arranged in first and second slices 222a and 222b.

The first encoding module 204 is configured to compress the first slice 222a to form a first independently compressed video slice 224a associated with the video content 220. The second encoding module 206 is configured to compress the second slice 222b to form a second independently compressed video slice 224b associated with the video content 220. The first and second independently compressed video slices 224a and 224b are not necessarily compressed with reference to other video streams, for instance, in contrast to MVC coded video streams in which the video streams are coded with respect to each other. Instead, each of the first encoding module 204 and the second encoding module 206 may respectively compress the first independently compressed video slice 224a and the second independently compressed video slice 224b without referencing the other one of the video slices 224a and 224b. "MPEG," as used herein, refers to a group of standards for encoding and decoding transport streams as defined by the Moving Picture Experts Group. MPEG includes several formats for transport streams such as MPEG-2 and MPEG-4 part 10/H.264. At least by virtue of the fact that the video contained in the first slice 222a and the second slice 222b are compressed separately, either of the first independently compressed video slice 224a and the second independently compressed video slice 224b may be decoded for viewing in 2D format.

According to an embodiment, the first independently compressed video slice 224a is compressed using a first compression format, for instance MPEG-2 and the second independently compressed video slice 224b is compressed using a second compression format, which differs from the first compression format, for instance MPEG-4. When the two slices 222a-222b are compressed using different coding standards (e.g. MPEG-2 and MPEG-4) the broadcast-centric constraints allow two video components with different stream_type values within same program (that is, the existing stream_type values for MPEG-2 video (0×02) and MPEG-4 (0×1B) may be used).

According to another embodiment, the first and second independently compressed video slices 224a and 224b are compressed in a common compression format. The second independently compressed video slice 224b may be at a lower resolution than the first independently compressed video slice 224a. The second independently compressed video slice 224b is assigned a new stream type that is different than the first independently compressed video slice 224a in the program map table for the transport stream 131. A program map table is used to describe each single program including elementary streams associated with the program. The stream type may be specified in the program map table. The new stream type for the second view may be allocated by a transport system, for instance MPEG-2

As further shown in FIG. 2, the descriptor processing module 208 is configured to receive the first independently compressed video slice 224a and the second independently compressed video slice 224b from the first encoding module 204 and the second encoding module 206. The descriptor processing module 208 is also configured to create and add an associated descriptor 226 to the first and second independently compressed video slices 224a and 224b. The descriptor 226 may comprise information pertaining to, for instance, which view each of the first and second independently compressed video slices 224a and 224b pertains, which encoding standard(s) was implemented to encode each of the first and second independently compressed video slices 224a and 224b, upsampling rules in instances where view resolutions differ, information for combining the views (for instance, field interleaving or frame interleaving, etc. The descriptor processing module 208 may receive information describing the first and second independently compressed video slices 224a and 224b from one or more of the manipulating module 202, the first encoding module 204 and the second encoding module 206, and may use this information in generating the descriptor 226. The descriptor 226 is configured to allow a decoder that receives the transport stream 131 containing the compressed video slices 224a and 224b to decode (including any adjustment of video resolutions) and render a 2D or 3D video from the decoded first and second slices 222a and 222b.

The multiplexing module 210 is configured to receive the first and second independently compressed video slices 224a and 224b respectively from the first encoding module 204 and the second encoding module 206. The multiplexing module 210 is thereafter configured to multiplex the first and second independently compressed video slices 224a and 224b along with the associated descriptor 226 to form at least one transport stream 131. For example, the first and second independently compressed video slices 224a and 224b may be included in a single transport stream. Alternately, the independently compressed video slices 224a and 224b may be sent in separate transport streams. The independently compressed video slices 224a and 224b and the descriptor 226 may be included in a common program in the at least one transport stream 131. A common program may correspond, for instance, to a single broadcasted channel. In addition, or alternatively, the at least one transport stream 131 may comprise Internet Protocol (IP) packets or may conform to any packetization scheme configured to enable transmission of the transport stream 131. For instance, the transport stream 131 may comprise an MPEG stream, IP packets or any suitable medium for transporting the 3D video from a source to an end user.

Figure 3:
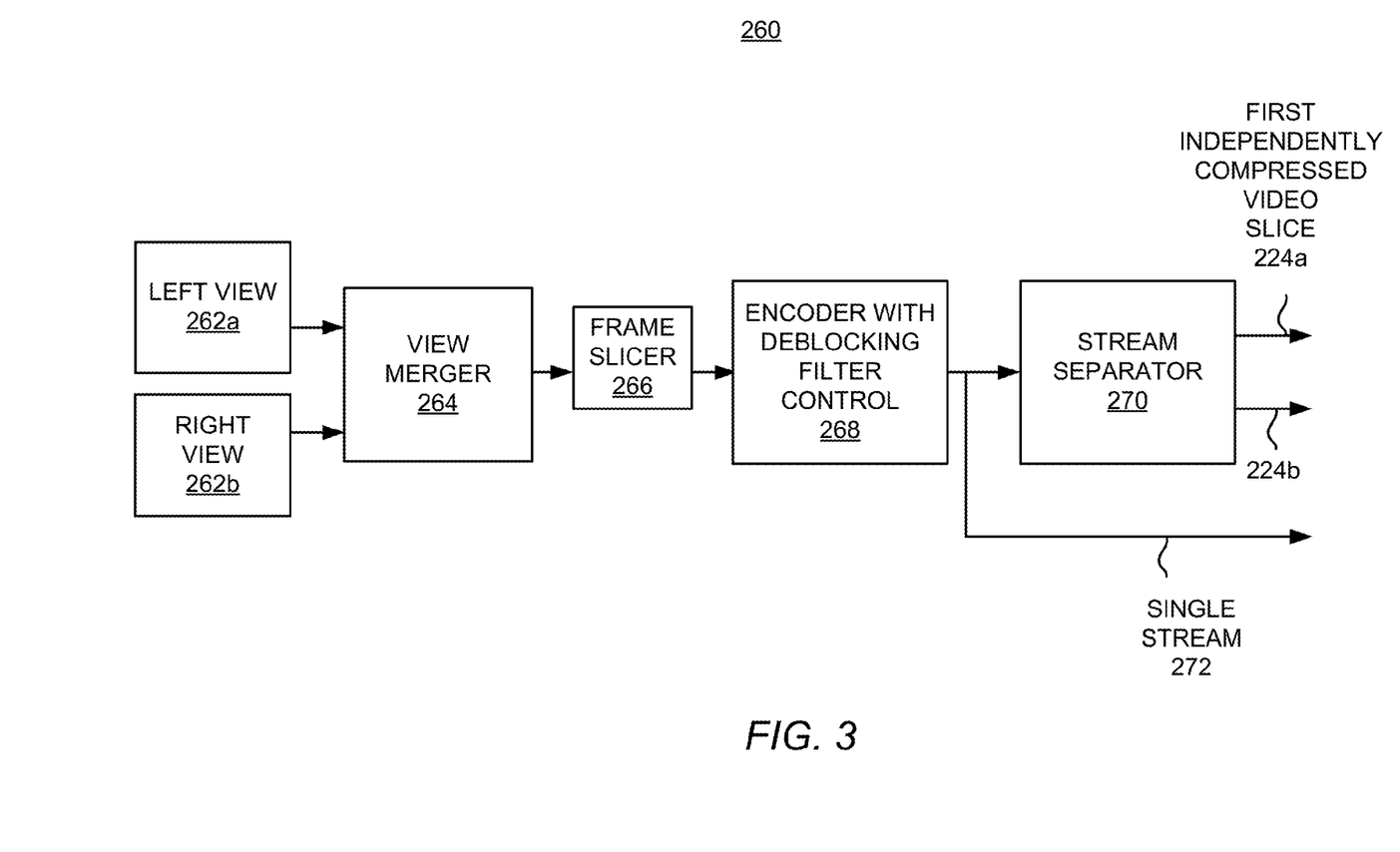
FIG. 3 illustrates a functional block diagram of a 3D video encoder, according to another embodiment of the invention.

FIG. 3 illustrates an alternative implementation of a 3D video encoder 260, according to an embodiment. As shown in FIG. 3, the 3D video encoder 260 includes a view merger 264, a frame slicer 266, an encoder 268, and a stream separator 270. It should be understood that the 3D video encoder 260 depicted in FIG. 3 may include additional components and that some of the components described herein may be removed and/or modified without departing from a scope of the 3D video encoder 260.

As shown in FIG. 3, the view merger 264 receives bits associated with a left view 262a and bits associated with a right view 262b. The view merger 264 is configured to merge the left and right views 262a-262b to form a single frame, for instance in a top and bottom format. In addition, the view merger 264 is configured to associate a descriptor for 3D composition with the single frame. The descriptor for 3D composition is configured to allow a decoder that receives at least one transport stream from the encoder 260 to decode (including any adjustment of video resolutions) and render a 2D or 3D video from the bits of the decoded first and second views 262a and 262b The frame slicer 266 is configured to slice the single frame into a plurality of slices of video for transport, for instance, as part of the same transport stream.

The encoder with deblocking filter control 268 is configured to encode the slices of video to form a single video frame and bit stream or alternately two separate bit streams. According to an embodiment, the single video frame and bit stream may be sent to end users, for instance, the subscribers 150a-150n in FIG. 1. Alternately, the single stream video frame may be separated by the stream separator 270 to form first and second independently compressed video slices 224a-224b and and communicated as separate video slices in multiple transport streams, for instance, as shown in and discussed with respect to FIG. 2 hereinabove.

Figure 4:
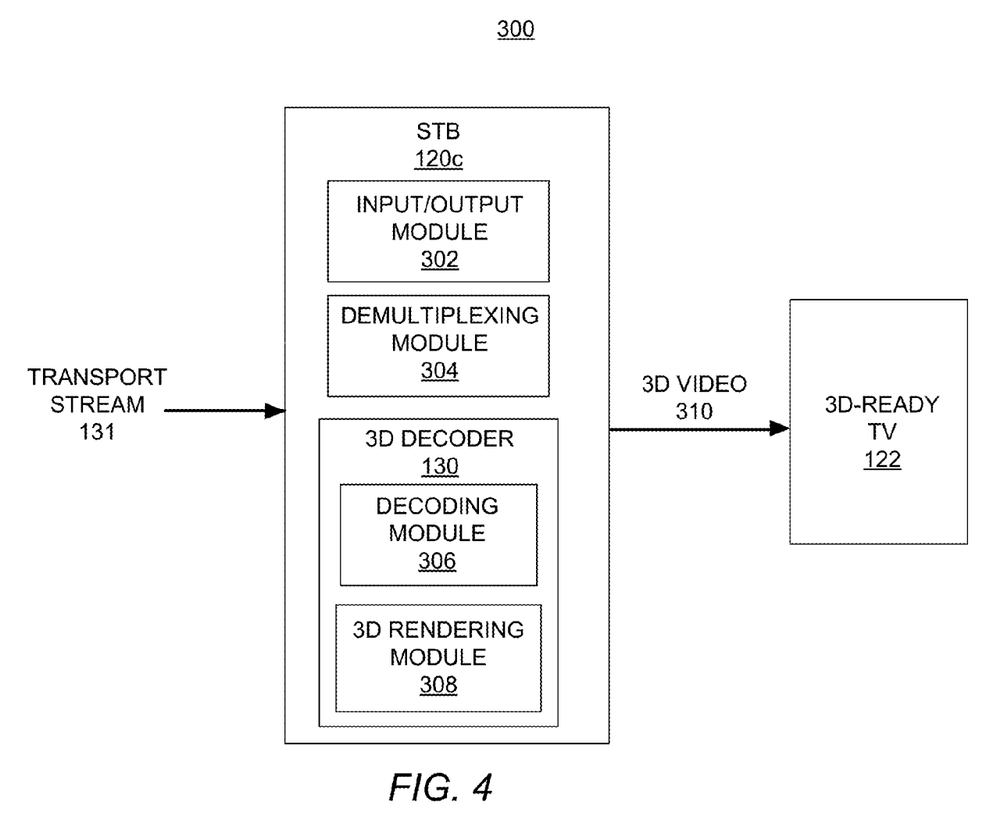
FIG. 4 illustrates a simplified block diagram of a 3D video decoder, according to an embodiment of the invention.

FIG. 4 illustrates a simplified block diagram of a system 300 configured to receive and display 3D content, according to an embodiment. The system 300 is depicted as including the STB 120c, including the 3D decoder 130, and the 3D-ready TV 122 from FIG. 1. As discussed above, the functions of the STB 120c may be performed by a variety of other devices, such as, devices and/or software integrated into one or more of televisions, computers, cellular telephones, PDAs, etc. It should be understood that the system 300 depicted in FIG. 4 may include additional components and that some of the components described herein may be removed and/or modified without departing from a scope of the system 300.

As shown in FIG. 4, the STB 120c includes an input/output module 302, a demultiplexing module 304, and the 3D video decoder 130, which includes a 3D decoding module 306, and a 3D combining module 308. The modules 302-308 may comprise software, hardware, or a combination of software and hardware. Thus, in one embodiment, one or more of the modules 302-308 comprise circuit components. In another embodiment, one or more of the modules 302-308 comprise software code stored on a computer readable storage medium, which is executable by a processor.

The input/output module 302 is configured to receive the transport stream 131 from the head end 110. The input/output module 302 may comprise a Universal Serial Bus (USB), an Ethernet interface, or another type of interface and the transport stream 131 may be a QAM modulated stream.

The demultiplexing module 304 may thereafter select a frequency and demodulate the frequency to obtain a multi program transport stream (MPTS). The demultiplexing module 304 is configured to demultiplex the MPTS to extract single program transport streams (SPTSs) corresponding to each of a plurality of programs which a subscriber may select. For instance, the subscriber 150n may use the STB 120c to select a program having 3D content. The demultiplexing module 304 then demultiplexes the MPTS to form the first and second independently compressed video slices 224a and 224b. Each of the first and second independently compressed video slices 224a and 224b has a different codec.

The 3D decoding module 306 is configured to decode the first and second independently compressed video slices 224a and 224b to form a first view and a second view. In decoding the first and second independently compressed video slices 224a and 224b, the 3D decoding module 306 is configured to access the descriptor 226 in the transport stream 131 and to employ the instructions contained therein in decoding the compressed video slices 224a and 224b.

The 3D rendering module 308 is configured to access the descriptor 226 in the transport stream 131 and render the 3D video 310 using the instructions contained therein. More particularly, the 3D rendering module 308 is configured to process the decoded first and second independently compressed video slices 224a and 224b to form the 3D video 310 suitable for display on the 3D-ready TV 122 as stereoscopic or multiple views. The descriptor 226 may include supplemental enhancement information (SEI) to form the 3D video 310. In addition, the input/output module 302 is configured to thereafter output the 3D video 310, for instance to a 3D-ready TV.

According to an embodiment, the first and second independently compressed video slices 224a and 224b are received in a single frame in a single transport stream. Alternately, the bits for the first and second independently compressed video slices 224a and 224b may be received in separate transport streams.

According to another embodiment, in instances in which the at least one transport stream 131 is an MPEG-2 conformant stream, some of the rendering and combining information from the descriptor 226 may be included in the compressed video stream (such as picture user-data). This provides information on use of single stream, combining and rendering two fields or two frames in the same video sequence and additional display related elements.

According to another embodiment, the 3D rendering module 308 is configured to stitch the frames (each of half vertical resolution) corresponding to the first and second views into a single video frame with the top half comprising one eye view and the bottom half comprising the other eye view. The 3D rendering module 308 is further configured to create a video frame in a top and bottom panel format and sends the video frame to a 3D ready TV 122 that is configured to render 3D video in the top and bottom panel format. The 3D video decoder 130 or the STB 120c may also be configured to insert caption text and on-screen display (OSD) information in both halves of the 3D video in the top and bottom panel format.

According to another embodiment, to render the 3D video 310, the 3D rendering module 308 is configured to vertically interpolate frames corresponding to both eye views to full resolution and to output the vertically interpolated frames to the 3D-ready TV 122 for 3D display. Additionally, the STB 120c may also be configured to insert caption text and OSD information in both of the vertically interpolated frames.

According to a further embodiment in which an STB 120n includes a 2D decoder 121, the 2D decoder 121 is able to render a 2D video from the same transport stream 131 containing both the first and second compressed video slices 224a and 224b. In this regard, the 2D decoder 121 is configured to decode one of the first and second compressed video slices 224a and 224b and to render of decoded streams for display on a 2D or 3D display. The 2D decoder 121 is capable of rendering a full resolution 2D video stream from one of the first and second compressed video slices 224a and 224b because each of the first and second compressed video slices 224a and 224b were compressed independently of each other. In addition, the 2D decoder 121 may interpolate one of the first view and the second view vertically to full resolution for display at a 2D or 3D display. Moreover, the 2D decoder 121 may discard the view that is not used to generate the video to be displayed. Accordingly, the transport stream 131 may be used to provide backwards compatibility in a network architecture having a mixture of STBs with conventional 2D decoders and STBs with 3D decoders. Additionally, the STB 120n in which the conventional 2D decoder is installed, for instance a conventional set top box, may be configured to insert caption text and OSD information after the interpolation.

According to an example, the 2D decoder 121 may select one of the first and second compressed video slices 224a and 224b based upon the type of compression employing to encode the video slices 224a and 224b. By way of example in which the 2D decoder 121 is configured to decode MPEG-2 encoded streams and the first compressed video slice 224a has been compressed using the MPEG-4 standard and the second compressed video slice 224b has been compressed using being MPEG-2 standard, the 2D decoder 121 may be configured to decode the second compressed video slice 224b.

Figure 5:
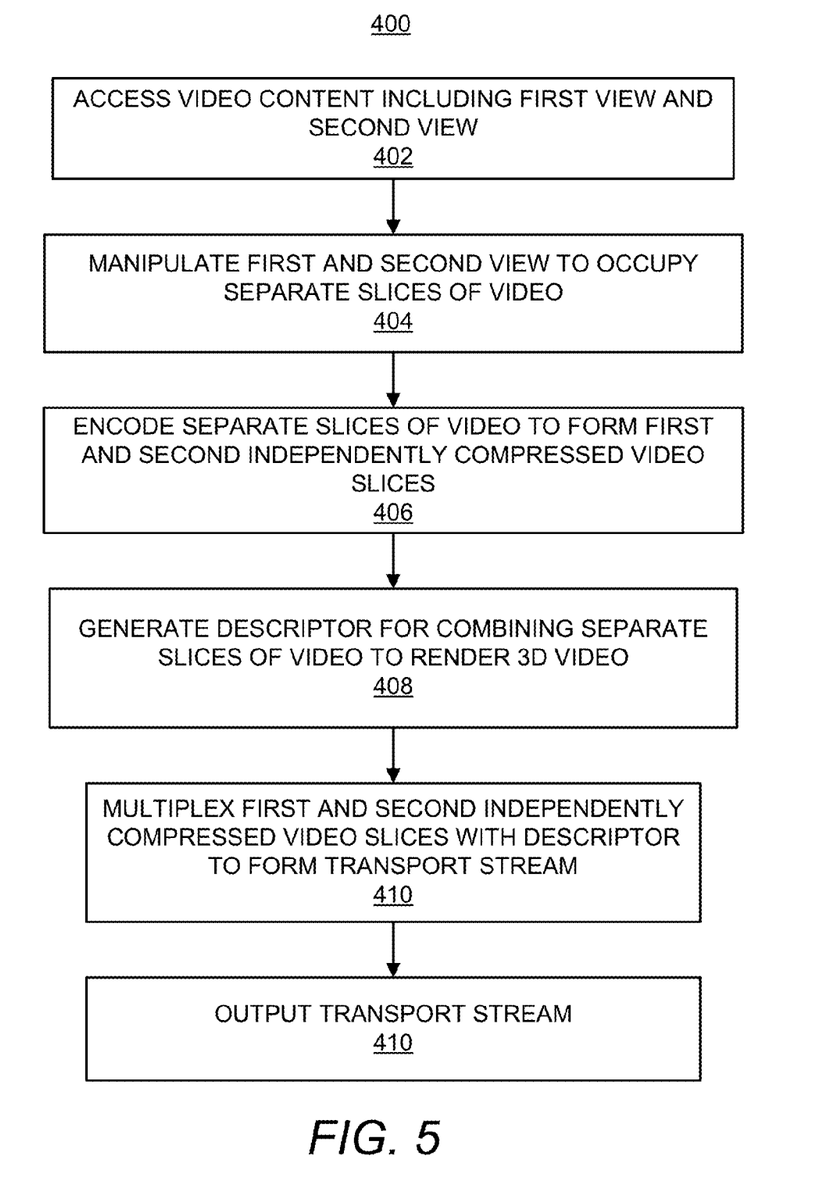
FIG. 5 illustrates a flow diagram of a method of encoding video content, according to an embodiment of the invention.
Figure 6:
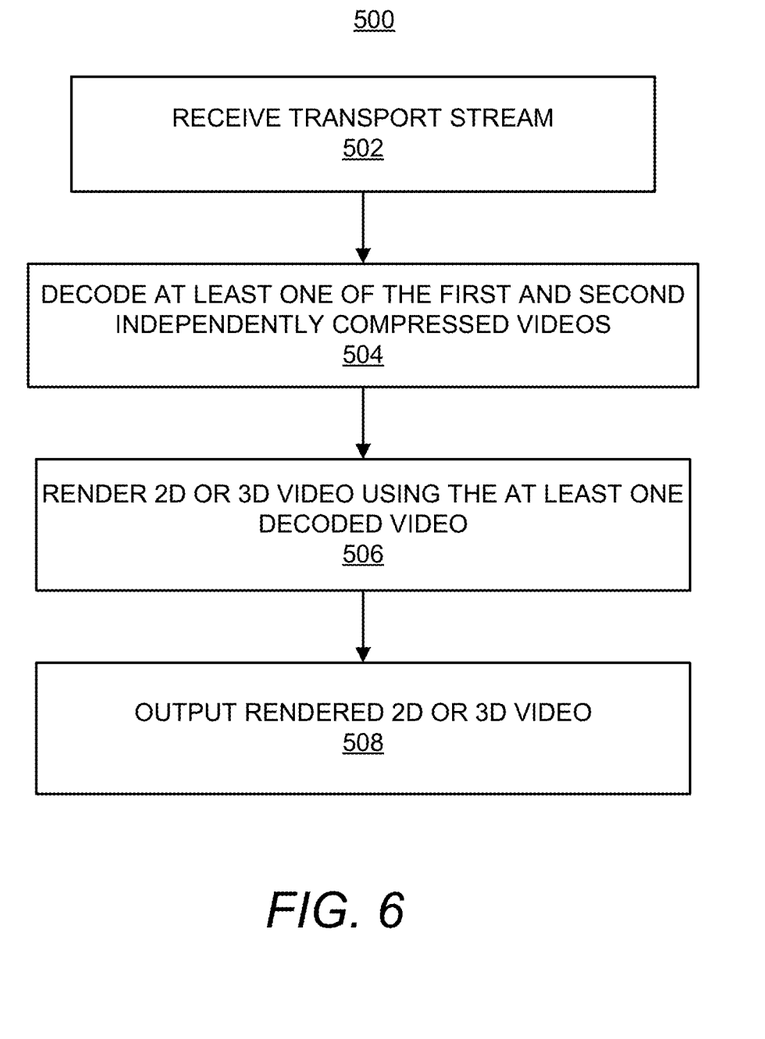
FIG. 6 illustrates a flow diagram of a method of rendering a transport stream into a displayable video, according to an embodiment of the invention, according to an embodiment of the invention.

Examples of a method in which the 3D video encoder 200 and the STB 120c may be employed for encoding a video stream and a method in which the video stream may be decoded to render video for display are now described with respect to the following flow diagrams of the methods 400 and 500 depicted in FIGS. 5 and 6, respectively. It should be apparent to those of ordinary skill in the art that the methods 400 and 500 represent generalized illustrations and that other steps may be added or existing steps may be removed, modified or rearranged without departing from the scopes of the methods 400 and 500. In addition, the methods 400 and 500 are described with respect to the components depicted in FIGS. 2, 3, and 4 by way of example and not of limitation.

Some or all of the operations set forth in the methods 400 and 500 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

With reference first to FIG. 5, there is shown a method 400 of encoding video content 220 to form a transport stream 131, according to an embodiment. The method 400 may be performed by the 3D video encoder 200 as described with respect to FIG. 2 hereinabove.

At step 402, video content 220 is accessed, for instance, by the manipulating module 202. As discussed above, the video content 220 may include a first view and a second view. The first view and the second view, may be operable to render 3D video.

At step 404, the manipulating module 202 manipulates the first and second views to occupy separate slices of video 800. For instance, the first and second views may be manipulated to occupy a first slice 222a of video and a second slice 222b of video, as shown in FIG. 8.

At step 406, the separate slices of video 800 are encoded by, respectively, the first encoding module 204 and the second encoding module 206 to form a first independently compressed video slice 224a and a second independently compressed video slice 224b. The first and second independently compressed video slices 224a and 224b may be compressed in a common compression format or alternately, in different compression formats as described hereinabove with respect to FIG. 2.

At step 408, the descriptor processing module 208 generates a descriptor 226 containing information for use in decoding and combining the first and second independently compressed video slices 224a and 224b to form one or both of a 2D and a 3D video.

At step 410, the multiplexing module 210 multiplexes the first and second independently compressed video slices 224a and 224b to form at least one transport stream 131. A decoder that receives the at least one transport stream 131 may be configured to decode the compressed video slices 224a and 224 contained in the at least one transport stream 131 to render a 2D or 3D video. The multiplexing module 210 may also include the descriptor 226 in the at least one transport stream 131.

At step 412, the transport stream 131 is output over a network to one or more subscribers 150a-150n, for instance as shown in FIG. 1.

Turning now to FIG. 6, there is shown a method 500 of rendering at least one transport stream 131 into a 2D or 3D displayable video, according to an embodiment. The method 500 may be performed by the STB 120c and/or the STB 120n as described with respect to FIG. 4 hereinabove.

At step 502, at least one transport stream 131 is received through, for instance, the input/output module 302 of the STB 120c/120n. As discussed above, the at least one transport stream 131 includes the first and second independently compressed video slices 224a and 224b as well as the descriptor 226.

At step 504, at least one of the first and second independently compressed video slices 224a and 224b is decoded. In a first example in which the decoder comprises a 3D decoder 130, the 3D decoder 130 decodes both the first and second independently compressed video slices 224a and 224b for rendering into a 3D display format. In a second example in which the decoder comprises a 2D decoder 121, the 2D decoder 121 becomes one of the first and second independently compressed video slices 224a and 224b for rendering into a 2D display format.

At step 506, the at least one decoded video slice is rendered for display as one of a 2D and a 3D video, for instance, by the 3D rendering module 308. In addition, at step 508, the rendered 2D or 3D video is output to one of a 2D and a 3D display 122 and 123.

Figure 7:
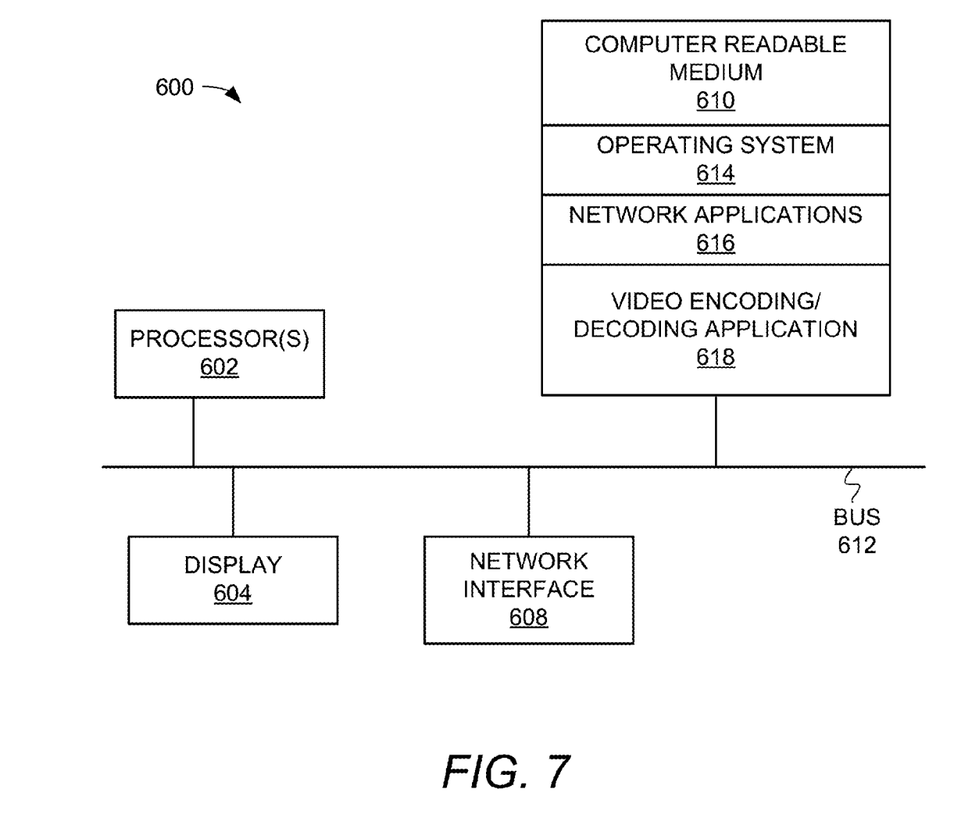
FIG. 7 shows a block diagram of a computer system that may be used in encoding video content in a transport stream and rendering 3D video from the transport stream, according to an embodiment of the invention.

Turning now to FIG. 7, there is shown a schematic representation of a computing device 600 configured in accordance with embodiments of the present invention. The computing device 600 includes one or more processors 602, such as a central processing unit; one or more display devices 604, such as a monitor; one or more network interfaces 608, such as a Local Area Network LAN, a wireless 802.11x LAN, a 3G mobile WAN or a WiMax WAN; and one or more computer-readable mediums 610. Each of these components is operatively coupled to one or more buses 612. For example, the bus 612 may be an EISA, a PCI, a USB, a FireWire, a NuBus, or a PDS.

The computer readable medium 610 may be any suitable medium that participates in providing instructions to the processor 602 for execution. For example, the computer readable medium 610 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 610 may also store other software applications, including word processors, browsers, email, Instant Messaging, media players, and telephony software.

The computer-readable medium 610 may also store an operating system 614, such as Mac OS, MS Windows, Unix, or Linux; network applications 616; and a video encoding/decoding application 618. The operating system 614 may be multi-user, multiprocessing, multitasking, multithreading, real-time and the like. The operating system 614 may also perform basic tasks such as recognizing input from input devices, such as a keyboard or a keypad; sending output to the display 604; keeping track of files and directories on medium 610; controlling peripheral devices, such as disk drives, printers, image capture device; and managing traffic on the one or more buses 612. The network applications 616 include various components for establishing and maintaining network connections, such as software for implementing communication protocols including TCP/IP, HTTP, Ethernet, USB, and FireWire.

The video encoding/decoding application 618 provides various software components for at least one of encoding 3D video content for transmission in a transport stream and decoding encoded video content for display as a 2D or 3D video, as discussed above. In certain embodiments, some or all of the processes performed by the application 618 may be integrated into the operating system 614. In certain embodiments, the processes can be at least partially implemented in digital electronic circuitry, or in computer hardware, firmware, software, or in any combination thereof, as also discussed above.

Embodiments of the present invention provide a method and apparatus for encoding video content to be rendered by a decoder as one of a 2D and a 3D video. The video content includes first and second views that correspond to displays for left and right eyes. When the video content is to be displayed as a 3D video, both the first views and second views are rendered. However, when the video content is to be displayed as a 2D video, such as, when a set-top box is equipped with a 2D decoder, only one of the first view and the second view is rendered. As such, a single transport stream containing both the first view and the second view may be transmitted to set-top boxes having one of a 2D and a 3D decoder.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are meant in their broadest reasonable sense unless otherwise indicated.

What is claimed is:

1. A method of encoding video content, the method comprising:
   manipulating bits of a first view and a second view of a three-dimensional (3D) video content to occupy a first slice of video and a second slice of video, the first view being a left eye view of the three-dimensional (3D) video content, the second view being a right eye view of the three-dimensional (3D) video content, wherein a boundary is formed between the first slice of the first view of the three-dimensional (3D) video content and the second slice of the second view of the three-dimensional (3D) video content, wherein the boundary enables a deblocking filter to be turned off across the boundary to prevent cross-talk between the left eve view of the first slice and the right eye view of the second slice, the deblocking filter being activated within each of the left eye view of the first slice and the right eye view of the second slice;
   encoding the bits of each of the left eve view of the first slice and the right eve view of the second slice separately from each other to form a first independently compressed video slice and a second independently compressed video slice; and
   multiplexing the first and second independently compressed video slices to form at least one transport stream, wherein the at least one transport stream is operable to be processed to render at least one of a two-dimensional (2D) video and a 3D video.

2. The method of claim 1, wherein multiplexing the first and second independently compressed video slices to form the at least one transport stream further comprises:
   multiplexing the first and second independently compressed video slices to form a single video frame, wherein the at least one transport stream includes the single video frame.

3. The method of claim 1, wherein multiplexing the first and second independently compressed video slices to form the at least one transport stream further comprises:
   multiplexing the first and second independently compressed video slices to form separate video slices, wherein the at least one transport stream includes the separate video slices.

4. The method of claim 1, wherein encoding each of the first slice and the second slice separately from each other further comprises:
   encoding the bits of the first slice and the second slice in a common compression format and assigning different stream types to the first independently compressed video slice and the second independently compressed video slice.

5. The method of claim 1, wherein the first independently compressed video slice is compressed using a first compression format, and the second independently compressed video slice is compressed using a second compression format, wherein the first compression format is different than the second compression format.

6. The method of claim 1, wherein at least one of the first and second independently compressed video slices is encoded in a full resolution 2D compatible stream operable to be processed to display the 2D video.

7. The method of claim 1, further comprising:
   generating a descriptor, wherein the descriptor contains information for use in rendering at least one of the first and second independently compressed video slices to render the at least one of the 2D video and the 3D video; and
   wherein multiplexing the first independently compressed video slice and the second independently compressed video slice further comprises including the descriptor in the at least one transport stream.

8. A method of rendering at least one transport stream into a displayable video, the method comprising:
   receiving the at least one transport stream, said transport stream including a first independently compressed video slice corresponding to a first view of a three-dimensional (3D) video content and a second independently compressed video slice corresponding to a second view of the three-dimensional (3D) video content, the first view being a left eye view of the three-dimensional (3D) video content, the second view being a right eye view of the three-dimensional (3D) video content, wherein the first and second views are configured to occupy separate slices of video, and wherein a boundary is formed between the left eve view of the first slice of the first view of the three-dimensional (3D) video content and the right eve view the second slice of the second view of the three-dimensional (3D) video content, wherein the boundary enables a deblocking filter to be turned off across the boundary to prevent crosstalk between the left eve view of the first slice and the right eve view of the second slice, the deblocking filter being activated within each of the left eve view of the first slice and the right eye view of the second slice;

decoding bits of at least one of the first and second independently compressed video slices; and rendering one of a two-dimensional (2D) video and a 3D video using the at least one decoded first and second independently compressed video slices.

9. The method of claim 8, wherein the first and second independently compressed video slices are received as one of a single video frame and separate video slices.

10. The method of claim 8, wherein receiving the at least one transport stream further comprises:

receiving a descriptor in the at least one transport stream; and wherein at least one of decoding and rendering further comprises at least one of decoding and rendering using the descriptor.

11. The method of claim 8, wherein the bits of the first and second independently compressed video slices have been respectively encoded in first and second compression formats that are different from each other, said method further comprising:

determining compression formats of the first and second independently compressed video slices;

selecting one of the first and second independently compressed video slices that has been compressed using a compression format compatible with a decoder; and wherein decoding further comprises decoding the bits of one of the first and second independently compressed video slices that has been compressed using a compatible compression format to render the 2D video.

12. The method of claim 8, wherein rendering the one of the 2D and the 3D video further comprises:

combining frames corresponding to the first and second slices into a single video frame, wherein the single video frame includes a top half composed of the bits of the first view and a bottom half composed of the bits of the second view.

13. A video encoder for encoding video content, the video encoder comprising:

one or more modules configured to manipulate bits of a first view and a second view of a three-dimensional (3D) video content to occupy a first slice of video and a second slice of video, the first view being a left eye view of the three-dimensional (3D) video content, the second view being a right eye view of the three-dimensional (3D) video content, wherein a boundary is formed between the left eve view of the first slice of the first view of the three-dimensional (3D) video content and the right eye view of the second slice of the second view of the three-dimensional (3D) video content, wherein the boundary enables a deblocking filter to be turned off across the boundary to prevent crosstalk between the left eve view of the first slice and the right eve view of the second slice, the deblocking filter being activated within each of the left eve view of the first slice and the right eye view of the second slice, the one or more modules configured to encode the bits of each of the first and the second slices separately from each other to form a first independently compressed video slice and a second independently compressed video slice, and to multiplex the first independently compressed video slice and the second independently compressed video slice to form at least one transport stream, wherein the at least one transport stream is operable to be processed to render at least one of a two-dimensional (2D) video and a 3D video; and a processor configured to implement the one or more modules.

14. The video encoder of claim 13, wherein the one or more modules are further configured to multiplex the bits of the first and second independently compressed video slices to form one of a single video frame and separate video slices.

15. The video encoder of claim 13, wherein the one or more modules are further configured to encode the bits of the first slice and the second slice under a common compression format and to assign the first and second independently compressed video slices with different stream types.

16. The video encoder of claim 15, wherein the one or more modules are further configured to encode the bits of the first slice and the second slice to be processed by a 2D decoder to form a full resolution 2D compatible stream.

17. The video encoder of claim 13, wherein the one or more modules are further configured to generate a descriptor associated with the first and second independently compressed video slices, wherein the descriptor contains information for use in rendering the bits of at least one of the first and second independently compressed video slices to render the at least one of the 2D video and the 3D video and to include the descriptor in the at least one transport stream.

18. A video decoder comprising:

one or more modules configured to receive at least one transport stream including a first independently compressed video slice corresponding to a first view of a three-dimensional (3D) video content and a second independently compressed video slice corresponding to a second view of the three-dimensional (3D) video content, the first view being a left eye view of the three-dimensional (3D) video content, the second view being a right eye view of the three-dimensional (3D) video content, wherein the first and second views are configured to occupy separate slices of video, and wherein a boundary is formed between the left eye view of the first slice of the first view of the three-dimensional (3D) video content and the right eye view of the second slice of the second view of the three-dimensional (3D) video content, wherein the boundary enables a deblocking filter to be turned off across the boundary to prevent crosstalk between the left eye view of the first slice and the right eye view of the second slice, the deblocking filter being activated within each of the left eye view of the first slice and the right eye view of the second slice;

said one or more modules being further configured to decode bits of one of the first and second independently compressed video slices when rendering two-dimensional (2D) video and decode bits of both the first and second independently compressed video slices when rendering 3D video; and a processor configured to implement the one or more modules.

19. The video decoder of claim 18, wherein the one or more modules are further configured to determine compression formats of the first and second independently compressed video slices, to select one of the first and second independently compressed video slices that has been compressed using a compression format compatible with a decoding module, and to decode the bits of one of the first and second independently compressed video slices that has been compressed using a compatible compression format to render a 2D video.

20. The method of claim 1, wherein the boundary defines a physical region to be provided for separating images on a video display.

21. The method of claim 20, wherein the boundary separates a top and a bottom of the video display.

\* \* \* \* \*